(12) United States Patent
Walls et al.

(10) Patent No.: US 6,365,082 B1
(45) Date of Patent: Apr. 2, 2002

(54) POLYMER GEL MOLDS

(75) Inventors: Claudia A. Walls, Oak Ridge; Stephen D. Nunn, Knoxville; Mark A. Janney, Knoxville; April D. McMillan, Knoxville; Glen H. Kirby, Knoxville, all of TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/211,732

(22) Filed: Dec. 15, 1998

(51) Int. Cl.[7] ............................................. B29C 33/40
(52) U.S. Cl. ....................... 264/219; 264/299; 264/317; 264/342 R
(58) Field of Search .................. 249/134; 264/299, 264/219, 317, 342 R

(56) References Cited

U.S. PATENT DOCUMENTS

| | | | | |
|---|---|---|---|---|
| 3,427,689 A | * | 2/1969 | Windecker | 249/134 |
| 3,628,988 A | * | 12/1971 | Stol et al. | 264/16 |
| 3,937,774 A | * | 2/1976 | Wiley et al. | 264/451 |
| 4,034,032 A | * | 7/1977 | Hendricks | 264/219 |
| 4,383,818 A | * | 5/1983 | Swannell | 425/546 |
| 4,592,887 A | * | 6/1986 | Bando et al. | 249/134 |
| 4,824,628 A | * | 4/1989 | Curfman | 249/134 |
| 4,836,853 A | * | 6/1989 | Gribi | 264/16 |
| 4,887,789 A | * | 12/1989 | Harris et al. | 249/134 |
| 4,894,194 A | | 1/1990 | Janney | 264/109 |
| 4,919,388 A | * | 4/1990 | Koike et al. | 249/134 |
| 4,980,112 A | * | 12/1990 | Masters | 249/134 |
| 5,028,362 A | | 7/1991 | Janney et al. | 264/25 |
| 5,094,607 A | * | 3/1992 | Masters | 249/134 |
| 5,145,908 A | | 9/1992 | Jenney et al. | 524/827 |
| 5,158,717 A | * | 10/1992 | Lai | 249/134 |
| 5,540,410 A | * | 7/1996 | Lust et al. | 249/134 |
| 5,984,256 A | * | 11/1999 | Endo | 249/134 |
| 6,003,832 A | * | 12/1999 | Ueno et al. | 249/134 |

FOREIGN PATENT DOCUMENTS

| | | | | |
|---|---|---|---|---|
| JP | 60-242014 | * | 12/1985 | 249/134 |
| WO | WO98/17418 | * | 4/1998 | |

* cited by examiner

*Primary Examiner*—Allan R. Kuhns
(74) *Attorney, Agent, or Firm*—Joseph A. Marasco

(57) ABSTRACT

A polymer gel is formed into a mold defining a preselected shape. A flowable composition may be formed into a preselected shape via contact with the polymer gel mold.

20 Claims, 2 Drawing Sheets

POLYMER GEL MOLDS

The United States Government has rights in this invention pursuant to contract no. DE-AC05-96OR22464 between the United States Department of Energy and Lockheed Martin Energy Research Corporation.

FIELD OF THE INVENTION

The present invention relates to forms, patterns molds, and the like for forming flowable compositions, and more particularly to the same which comprise polymer gels.

BACKGROUND OF THE INVENTION

The process of forming flowable compositions into preselected shapes involves the use of patterns (usually positive shape), molds (usually negative shape), cores (including fugitive cores), plates, forms, templates, dies, components of the foregoing, and the like. The term "mold" is defined and used hereinafter as an inclusive term and, unless otherwise specified, means any or all of the foregoing and any equivalents thereof.

Flowable compositions are brought into contact with a mold, take on the shape thereof, and subsequently solidified. Mold materials are generally nonporous and rigid, and are often machined into a preselected mold shape. There is a significant cost involved in preparing machined molds which could be avoided if suitable castable materials were available. Also, rigid molds are prone to problems (due to, for example, friction stress) associated with removal of formed product from the mold.

Of particular interest are molds for forming gelcasting compositions, especially for prototyping and small lot production runs. A simple and inexpensive molding system is needed for such forming tasks.

Research has shown that many castable mold materials are unsuitable for gelcasting. For example, silicone, urethane, and various waxes have disadvantageous surface reactions with gelcasting compositions which distort the formed product. Conventional plaster of paris molds are porous and draw water and other liquid solvents and/or vehicles out of the gelcasting slurry.

In order to provide comparison data, silicone elastomer and mold wax were evaluated as molds for gelcast aluminum oxide. The effect of mold release agents generally considered to be superior with respect to gelcasting aluminum oxide was shown to be of little use with silicones such as RTV (Trade name of silicones manufactured by GE Silicones, General Electric Company, Waterford, N.Y. 12188) and wax mold material such as BW2260 (available from Blended Waxes, Inc.) As shown in Table I, no material in this series of trials yielded an acceptable level of surface feature retention. As cast samples were characterized by ungelled (unpolymerized) surface layers or poor feature retention. Dried samples were characterized by surface flaking or poor surface features.

TABLE I

| Mold Material | Condition | Mold Release | Result (as cast) | Result (dried) |
|---|---|---|---|---|
| RTV-11 Silicone | As cast | — | Ungelled layer* | Flaking |
| RTV-11 Silicone | 60° C. overnight | — | Thin ungelled layer# | Thin flaking |
| RTV-11 Silicone | Vacuum overnight | — | Thin ungelled layer# | Thin flaking |
| RTV-11 Silicone | As cast | AZN Mold Wiz | Thin ungelled layer# | Thin flaking |
| RTV-11 Silicone | As cast | Polyester Parfilm | Thin ungelled layer# | Thin flaking |
| RTV-11 Silicone | As cast | AXEL FFIH-15R | Ungelled layer* | Flaking |
| RTV-60 Silicone | As cast | — | Ungelled layer* | Flaking |
| RTV-60 Silicone | 60° C. overnight | — | Thin ungelled layer# | Thin flaking |
| RTV-60 Silicone | Vacuum overnight | — | Thin ungelled layer# | Thin flaking |
| RTV-60 Silicone | As cast | AZN Mold Wiz | Thin ungelled layer# | Thin flaking |
| RTV-60 Silicone | As cast | Polyester Parfilm | Thin ungelled layer# | Thin flaking |
| RTV-60 Silicone | As cast | AXEL FFIH-15R | Ungelled layer* | Flaking |
| BW2260 Wax | As cast | — | Poor feature Retention | Poor surface |
| BW2260 Wax | As cast | Polyester Parfilm | Poor feature Retention | Poor surface |

*Ungelled layer was approximately 1/8" to 1/6" thick.
Thin ungelled layer was approximately 1/16" to 1/32" thick.
*#Ungelled layers were not uniform in thickness over the surface of the cast part.

OBJECTS OF THE INVENTION

Accordingly, objects of the present invention include the provision of non-rigid molds which are inexpensively and easily fabricated, are not prone to problems due to friction stress associated with removal of formed product from the mold, and do not have surface reactions with gelcasting compositions which distort the formed product. Further and other objects of the present invention will become apparent from the description contained herein.

SUMMARY OF THE INVENTION

In accordance with one aspect of the present invention, the foregoing and other objects are achieved by a mold which includes a polymer gel body which defines a preselected shape so that a flowable composition may be formed into the preselected shape via contact with the mold.

In accordance with another aspect of the present invention, a method of forming a flowable composition into a preselected shape which includes the steps of Step 1. forming a polymer gel into a mold which defines a preselected shape;

Step 2. contacting a flowable composition with the mold to form the flowable composition into the preselected shape; and, Step 3. solidifying the flowable composition to produce a formed article.

Figure 1:
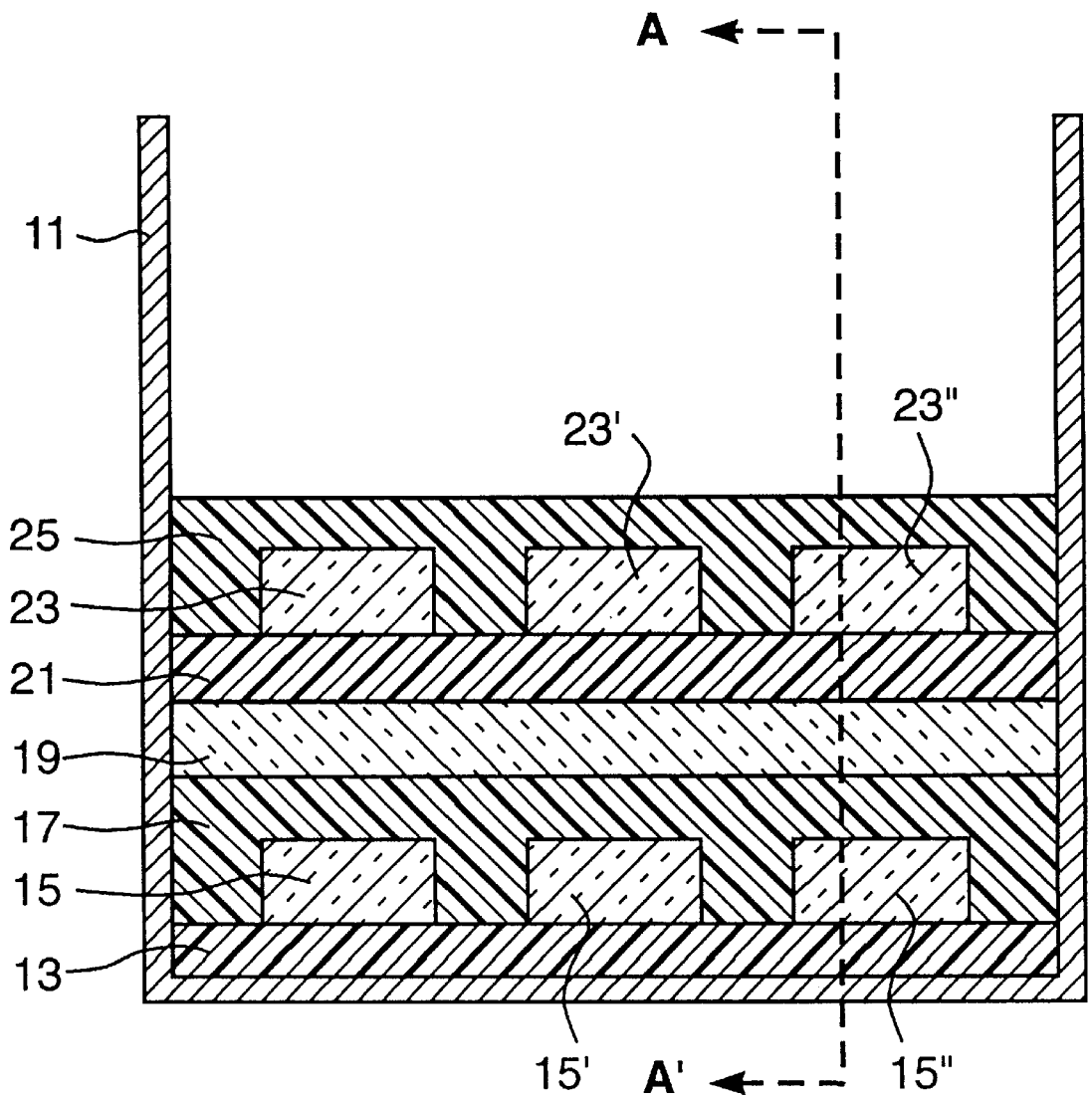
FIG. 1 is a sectional side view illustrating a layered gelcasting process in accordance with the present invention.

For a better understanding of the present invention, together with other and further objects, advantages and capabilities thereof, reference is prepared to the following disclosure and appended claims in connection with the above-described drawings.

DETAILED DESCRIPTION OF THE INVENTION

By casting or otherwise forming and hardening a monomer solution in contact with an article of a preselected shape or a positive pattern of the article having the preselected shape, the gelled monomer solution forms a negative gel mold of the preselected shape. The mold is then useful for casting a flowable composition, generally via conventional methods.

Technology of particular interest involves gelcasting compositions, both for mold materials and for flowable composition materials, some of which are disclosed in the following patents:

1. U.S. Pat. No. 4,894,194 issued on Jan. 16, 1990 to M. A. Janney, the entire disclosure of which is incorporated herein by reference;
2. U.S. Pat. No. 5,028,362 issued on Jul. 2, 1991 to M. A. Janney and O. O. Omatete, the entire disclosure of which is incorporated herein by reference; and 3. U.S. Pat. No. 5,145,908 issued on Sep. 8, 1992 to M. A. Janney and O. O. Omatete, the entire disclosure of which is incorporated herein by reference.

Glossary of terms used herein:

| | |
|---|---|
| APS | 10% Ammonium Persulfate Solution in $H_2O$ |
| HMAM | Hydroxymethylacrylamide, n-metholylacrylamide |
| MAM | Methacrylamide |
| MBAM | N,N'-Methylenebisacrylamide |
| PEG (n) | Polyethylene glycol (mol. wt.) |
| PEGDMA | Polyethylene glycol (1000) dimethacrylate |
| Raw Gel | A gel that is not loaded with particles, also called a neat gel |
| TEMED | Tetramethylethylenediamine |

The terms "polymer gel" and "gel", as used herein, are defined as a polymer-solvent interpenetrating network that is derived from at least one of: a solution or mixture of a monomer and solvent and/or vehicle by a polymerization reaction; and a solution of a polymer and solvent (and optionally a chemical additive) by changing the temperature of the solution. Hereinafter, solvents and vehicles are referred to as solvent(s) because of their similar function. The solvent can be either aqueous or non-aqueous. Expressly excluded in the foregoing definition are rubbery materials formed by plasticizing brittle polymers, for example, plasticized poly (vinyl chloride).

Some examples of gels that fulfill this definition include (but are not limited to) the following:

1a) Free radical polymerization mechanism. A gel made by polymerizing a solution of MAM, MBAM, and $H_2O$ using a free radical initiator to polymerize the monomers.
1b) Free radical polymerization mechanism. A gel made by polymerizing a solution of HMAM in $H_2O$ using a free radical initiator.
1c) Condensation polymerization. A gel made by polymerizing a solution of a commercial two part epoxy resin (with hardener) and acetone.
2a) Gelation on cooling. A gel made by cooling a solution of agar in $H_2O$ from above its melting point to below its melting point.
2b) Gelation on cooling. A gel made by cooling a solution of poly (vinyl alcohol), borax (or Congo Red), and $H_2O$ from above its melting point to below its melting point.
2c) Gelation on heating. A gel made by heating a solution of methylcellulose and $H_2O$ from below its critical solution temperature to above its critical solution temperature.

A polymer gel can be derived from any of a variety of sources, for example, vinyl polymerization of at least one monomer, condensation polymerization of at least one monomer, a solution of at least one naturally occurring polymer, and a gel produced from a solution of at least one synthetic polymer.

A polymer gel produced by vinyl polymerization of monomers may include at least one of, for example, a gel made by polymerizing at least one monofunctional vinyl monomer and at least one multifunctional vinyl monomer, a gel made by polymerizing at least one multifunctional vinyl monomer, and a gel made by polymerizing hydroxymethylacrylamide and a water-soluble comonomer in $H_2O$.

A polymer gel produced by condensation polymerization of a monomer may include at least one of, for example, epoxies, urethanes, phenolics, furans, and melamines.

A polymer gel produced from a solution of a natural polymer may include at least one polysaccharide, for example, agar, xanthan gun, starch, and locust bean gum. Moreover, a polymer gel produced from a solution of a natural polymer may include at least one protein, for example, gelatin and albumin.

A gel produced from a solution of a synthetic polymer may include at least one polymer, for example, cellulose, a cellulose derivative, poly (vinyl alcohol), poly (acrylic acid), and poly (acrylamide).

The polymer mold can be plasticized via a conventional plasticizing method to prevent drying. Monomer combinations designed to dry very slowly once polymerized can be used to extend working time and mold assembly time. Humidity controls can be used to further slow the drying process. Non-aqueous or aqueous solvents can be used in neat gel formulations, and can be specifically tailored to slow drying and extend working time of the mold gels.

Mold release agents can be used between the mold gel and the flowable composition to prevent bonding of the mold gel to the flowable composition. Moreover, monomer formulations can be selected for the mold which do not bond to the flowable composition.

Polymers which are reversible such as agarose and/or gelatin based polymers can be used as molds for the gelcasting of flowable monomer solutions. Via reversible gelation, molds based on aragose or gelatin can be removed before firing by dissolving in warm or hot $H_2O$.

Reinforcement materials in the form of particles, plates and/or fibers such as fibrous carbon can be added to increase the strength or rigidity of mold gels. For fugitive molds such as cores, reinforcement materials are preferably selected from materials that will burn out easily with conventional gelcasting binder burn out and/or sintering schedules known to and used by the skilled artisan for the specific material being processed. Suitable reinforcement materials may be reactive or relatively inert, and may include polymer compositions, metal compositions, ceramic compositions, and biologically obtained compositions such as fibers.

Layered, sequential casting of flowable compositions can be combined with gel molds to form complex internal or external features in parts, as is described further hereinbelow.

A gel mold can be isotropically reduced in size by a preselected percentage by partially or completely drying the gel mold after it is formed. A shrinkage factor can be easily targeted within the limits of the organic content of the gel. Thus, a positive mold for the negative gel mold can be fabricated oversize for ease of creating precise features.

A monolithic billet of gel can be shaped via carving or machining to form a positive pattern from which a plaster of paris (or other suitable material) slip casting mold can be formed. A negative mold can also be carved or machined. A plurality of shaped monoliths of gel can be assembled into a positive mold or a negative mold.

It is not generally necessary to match the monomer solution from which the mold is made with the flowable composition that is molded therewith. Flowable compositions suitable for processing according to the present invention include all known gelcasting compositions. Also suitable are chemically bonded inorganic compositions, for example, plasters such as plaster of paris, cementitious compositions such as portland cement-based compositions, phosphoric acid-bonded alumina compositions, and calcium aluminate-based compositions. Other suitable flowable compositions include silicone rubber-based compositions, fluid polymer-based compositions such as urethanes, epoxies, and unsaturated polyesters, and all other known flowable compositions suitable for molding at temperatures not exceeding the useful limits of the gel mold composition.

A suitable flowable composition may also include a reinforcement phase such as a polymer, a metal, a ceramic, and/or a biologically obtained material. The reinforcement phase may be in the form of powder, fibers, plates, etc., as is well known in the art of molding flowable compositions.

Processing temperatures are not critical to the invention, and temperatures may be selected which are within the useful ranges of the mold composition and the flowable composition. For most applications, the selected flowable composition can be contacted with a gel mold at room temperature, and the flowable composition can be subsequently solidified at a temperature not exceeding the boiling point of the solvent.

EXAMPLE I

A 1"×1" cylinder was formed by gelling a 48 vol % HMAM monomer solution at room temperature in 4 min. using TEMED and 10% APS in a glass mold. The gel cylinder was then centered as a core in a 2¼" diameter by 1 inch high aluminum mold and used to mold a gelcasting composition. A flowable gelcasting composition comprising a slurry of 55 vol. % solids loaded aluminum oxide in a solution of 20% HMAM in $H_2O$ accelerated with TEMED and APS was cast into the mold cavity defined by the aluminum mold and the cylindrical gel core. Gelation was complete at the mold-slurry interface—there was no ungelled layer, no distortion, and no signs of adherence of the mold to the gelled slurry. The HMAM gel core did not inhibit gelation, nor did it adhere to the aluminum oxide loaded gel. The surface finish of the product was comparable to a finish derived from a glass or highly polished metal mold.

EXAMPLE II

A solution comprising 50 grams 48% HMAM solution, 10 grams $H_2O$, and 5 grams polyethyleneglycol 400 (PEG 400) was used to cast a negative mold of a steel gear centered inside an aluminum puck mold. The solution was accelerated with TEMED and APS and gelled at room temperature in 15 minutes. The resulting gel mold was removed from the gear and used to mold a gelcasting composition. A gelcasting slurry of 55 volume percent solids loaded aluminum oxide in a solution of 20% HMAM in $H_2O$ was accelerated with TEMED and APS and cast into the gel mold. The mold was placed in a closed container to prevent drying out the gel and then heated at 60° C. in an oven for 15 minutes to gel the loaded slurry. The resulting gelcast gear was freed from the mold and dried. There was no inhibition of gelling at the mold slurry interface and the mold did not adhere to the gear, which retained the exact shape of the steel gear, with no imperfections visible to the naked eye.

EXAMPLE III

A solution comprising 15 grams of agar and 485 grams of $H_2O$ was used to cast a mold of a metal gear. The gear was heated to 60° C. prior to the introduction of the agarose solution. The mold was allowed to cool and the metal gear was removed. The cast agarose mold had no visible defects. A gelcasting slurry of 55 vol. % alumina-loaded MAM/MBAM 6:1 solution was cast into the agarose gear mold and gelled at 60° C. The ceramic gear formed thereby was free of defects and exhibited a surface finish comparable to a finish derived from a glass or highly polished metal mold. The mold survived the temperature excursion of the gelling step but was destroyed during removal of the gelcast gear.

EXAMPLE IV

A series of gel molds are fabricated as described in Examples I, II, and III. The molds are filled with various flowable compositions: plaster, a conventional Portland cement-based composition, and a calcium aluminate-based composition. The flowable compositions are allowed to set according to conventional methods. The set parts are removed from the gel molds and dried according to normal procedures.

EXAMPLE V

A gel was used to make fugitive cores in order to form internal mold features in a layered gelcasting process to make a prototype cross-flow heat exchanger component. An anodized aluminum 1 cm×10 cm×25 cm flat pan mold was assembled and sprayed with Polyester Parfilm from mold release agent (available from Price-Driscol Corp., 17 Industrial Drive, Waterford Conn. 06385). The mold was filled with a solution comprising 250 grams 20% HMAM sol, 125 µl TEMED, 1.25 cc 10% APS. The solution was allowed to gel at room temperature for 30 minutes. Rectangular gel bars were cut from the resulting gel plate. Six short bars measured 1 cm×2 cm×5 cm and one long bar measured 1 cm×2 cm×10 cm. The bars were used in the following process.

A gelcasting slurry comprising 162.48 grams $H_2O$, 27.00 grams MAM, 9.00 grams PEG(1000)DMA, 8.76 grams Darvan 821-A (dispersant), and 875.60 grams aluminum oxide (Reynolds RCHP-DBM+0.05% MgO) was prepared.

Figure 2:
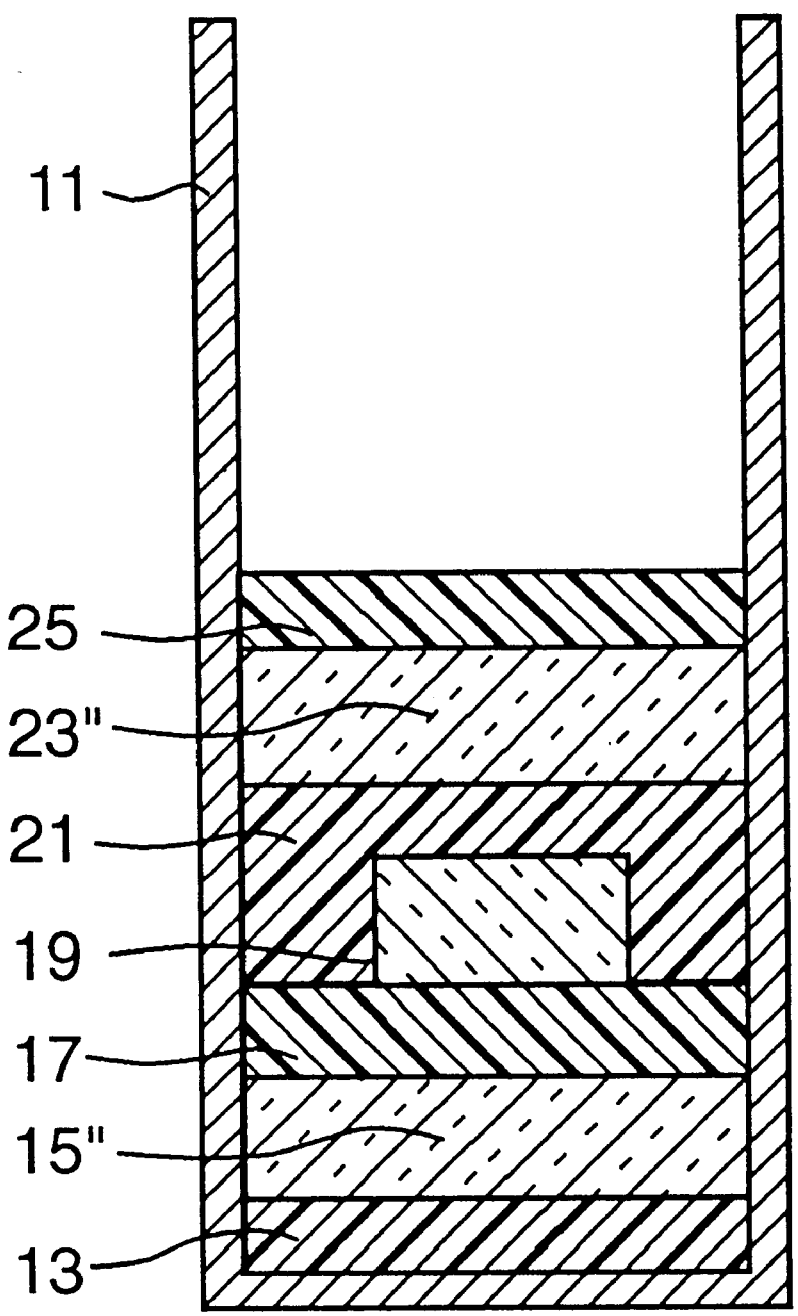
FIG. 2 is a view through section A A' of FIG. 1.

Referring to FIGS. 1 and 2, an anodized aluminum mold 11 measuring 5 cm×10 cm×10 cm was coated with Polyester Parfilm mold release agent. A 70 gram portion of the slurry was mixed with 70 µl Surfynol 104-E (defoamer available from Air Products and Chemicals, Inc., 7201 Hamilton Blvd. Allentown, Pa. 18195-1501), 10.5 µl TEMED, and 105 µl 10% APS and cast in the mold 11 to form a first (bottom) layer 13 of a stacked assembly. The first layer 13 was gelled in a 60° C. oven for 15 min.

Three short gel bars 15, 15', 15" were placed in parallel fashion on top of the gelled first layer 13 as shown in FIGS. 1 and 2. A 125 gram portion of the slurry was mixed with 125 µl Surfynol 104-E, 18.8 µl TEMED, and 188 µl 10% APS was cast in the mold 11 over the bars 15, 15', 15" to form a second layer 17. The assembly was heated in a 60° C. oven for 15 min. to gel the second layer 17.

The long gel bar 19 was placed perpendicularly to the three short gel bars 15, 15', 15" on top of the second layer 17. Another 125 gram portion of the slurry was mixed with 125 μl Surfynol 104-E, 18.8 μl TEMED, and 188 μl 10% APS was cast in the mold 11 over the bars 15, 15', 15" to form a third layer 21. The assembly was heated in a 60° C. oven for 15 min. to gel the third layer 21.

The remaining three short gel bars 23, 23', 23" were placed in parallel fashion on top of the gelled third layer 21. The bars 23, 23', 23" were parallel to the other three short gel bars 15, 15', 15", and perpendicular to the long gel bar 19. Another 125 gram portion of the slurry was mixed with 125 μl Surfynol 104-E, 18.8 μl TEMED, and 188 μl 10% APS was cast in the mold 11 over the bars 23, 23', 23" to form a fourth layer 25. The assembly was heated in a 60° C. oven for 15 min. to gel the fourth layer 25.

The gelled assembly was removed from the mold 11, dried to remove the solvent, and fired via the following temperature program:

1. Room temperature to 1500° C. at a rate of about 2° C./minute.
2. Hold 1500° C. for 2 hours.

1500° C. to room temperature at a rate of about 2° C./minute.

The gelled layers sintered together to form a monolithic, robust, finished ceramic article of the preselected complex shape. The gel fugitive cores burned out completely to produce rectangular voids in the finished ceramic article that resemble those of a cross-flow heat exchanger.

EXAMPLE VI

An HMAM solution as described in Example I was cast in a metal mold which was a 3 inch long section of a 75 mm rifled gun barrel, thereby forming a replica of the internal features thereof. The resulting gel article was positioned as a core in a PVC ring in order to gelcast a ceramic replica of the gun barrel section. A gelcasting slurry as described in Example V was gelcast in the PVC ring around the gel core. The HMAM gel core was easily broken up and removed after the slurry gelled and before the gelcast article was dried.

EXAMPLE VII

An aluminum coin was set up in a disk mold in order to rapidly cast a mold of one face of the coin. A mold was fabricated in 3 minutes using 50 grams 20% HMAM, 100 μl TEMED, and 1 cc 10% APS. A gelcasting slurry comprising 40 grams of 55 vol % solids loaded alumina in 15% MAM/PEGDMA 3:1 was accelerated with 20 μl TEMED and 100 μl 10% APS and de-aired. The slurry was then cast in the HMAM mold, covered with aluminum foil on top and left in a disk mold to protect the gel mold's base and sides from drying in the oven. The filled mold was heated for 10 minutes at 60° C. to gel. Subsequently, the mold was removed, cooled under flowing $H_2O$, and the alumina coin replica was removed. The replica was somewhat rubbery but yielded a reproduction of fine coin details with no flaws visible to the naked eye.

EXAMPLE VIII

A gel mold fabricated as described in Example VII was partially dried to shrink the mold diameter by about 50%. An alumina coin replica was gelcast in the shrunken mold. The reduced size replica reproduced the fine coin details with no flaws visible to the naked eye. Undistorted coin details evidenced linear gel shrinkage.

EXAMPLE IX

An HMAM mold was cast as described in EXAMPLE VI around a nylon gear to test surface duplication against nylon. The resulting gel mold exhibited exact features of the nylon gear to the naked eye, showing suitability for casting against nylon patterns.

EXAMPLE X

HMAM molds were cast as described in EXAMPLE VI around two metal guides for bone implants. Alumina gelcasting slurry was cast in the HMAM molds as described in Example VI. The green gelcast articles exhibited exact features of the metal guides to the naked eye, showing suitability for use of the invention for use in bioceramic technology.

EXAMPLE XI

A gel comprising 15% MAM/NVP/MBAM 3:3:1 in $H_2O$ was cast into a large petri dish containing three small glass disks to form a gel mold having three depressions and a very smooth overall surface. A plaster of Paris slurry was cast into the gel mold via conventional technique. The resulting plaster of Paris casting exhibited an excellent surface finish suitable for use as a slip casting mold.

EXAMPLE XII

A plaster of Paris mold was fabricated with a solution of 15% MAM/NVP/MBAM 3:2:1 substituted for the $H_2O$ normal to the mixture. The resulting mold was a nonporous plaster of Paris mold which was suitable for gelcasting. The mold was stored overnight in an airtight container to prevent drying. Examination the following day showed the mold had smooth surface, mold release spray was applied and stayed on the surface of the mold—the glossy look of the sprayed surface indicated the mold was not porous.

EXAMPLE XIII

A 1 Kg slurry of 99% aluminum oxide and 1% silica was prepared in a 20% solution of HMAM/PEGDMA 4:1 and initiated. 150 grams of slurry was initiated with 22.5 micro liters of TEMED and 225 micro liters of 10% ammonium persulfate solution. The slurry was de-aired under vacuum and cast into the plaster mold described in Example XII hereinabove. The filled mold was left for 30 minutes to gel at room temperature. The aluminum oxide and silica loaded slurry gelled and formed a cast article with a smooth, undistorted surface finish against the plaster mold, with no surface defects.

In the following Examples XIV, XVI, and XVII, the ratio of premix solution to plaster to initiator formula follows the pattern:

150 grams aqueous monomer solution
300 grams plaster of Paris
30 μl TEMED
300 μl 10% Ammonium persulfate solution

EXAMPLE XIV

A plaster of Paris mold was fabricated with a solution of 15% MAM/MBAM 6:1 substituted for the $H_2O$ normal to the mixture. The resulting mold was a nonporous plaster of Paris mold suitable for gelcasting. The mold was cast and left to set up overnight at room temperature in a sealed container. The next day the mold was examined and found to exhibit a smooth, undistorted surface finish with no defects.

EXAMPLE XV 100 grams of 20% HMAM based 50 vol % solids loaded aluminum oxide slurry initiated with 20 μl TEMED and 200

μl 10% ammonium persulfate solution was cast into the plaster of Paris mold described in Example XIV. The resultant cast article was smooth and showed no surface defects.

EXAMPLE XVI

A plaster of Paris mold was fabricated with a solution of 20% HMAM substituted for the $H_2O$ normal to the mixture. The resulting mold was a nonporous plaster of Paris mold suitable for gelcasting. The mold was cast and left to set up overnight at room temperature in a sealed container. The next day the mold was examined and found to exhibit a smooth surface finish with no defects.

EXAMPLE XVII

A plaster of Paris mold was fabricated with a solution of 15% MAM/PEDMA 3:1 substituted for the $H_2O$ normal to the mixture. The resulting mold is a nonporous plaster of Paris mold which is suitable for gelcasting. The mold was cast and left to set up overnight at room temperature in a sealed container. The next day the mold was examined and found to exhibit a smooth finish with no surface defects.

EXAMPLE XVIII 100 grams of 20% HMAM based 50 vol % solids loaded aluminum oxide slurry accelerated with 20 μl TEMED and 200 μl 10% ammonium persulfate solution solution was cast into the plaster of Paris mold described in Example XIX. The resultant cast article exhibited a smooth finish with no surface defects.

EXAMPLE XIX

A gel mold was fabricated using 20% HMAM solution initiated with TEMED and APS. 100 grams of this solution was initiated with 100 μl TEMED and 1 cc 10% APS. This solution was cast into a cup around a glass disk and allowed to gel for about 5 min. at room temperature. The glass disk was removed and the cavity was filled with Devcon 5 minute epoxy. The epoxy cured in the mold and was removed after 10 minutes. The resultant cast article exhibited a smooth finish with no surface defects.

EXAMPLE XX

A gel mold was fabricated using 20% HMAM solution initiated with TEMED and APS. 100 grams of this solution was initiated with 100 μl TEMED and 1 cc 10% APS. This solution was cast into a cup around a glass disk and allowed to gel for about 5 min. at room temperature. The glass disk was removed and the cavity was filled with silicone elastomer (A-103 Prosthetic Silicone Elastomer—a product of Dow Corning and was supplied by Factor II, Inc. Box 1339 Lakeside, Ariz. 85929). The filled mold was placed in an oven at 55° C. to cure the silicone for 2 hours. The silicone elastomer cured in the mold, released easily, and exhibited a smooth finish with no surface defects.

The product literature for the silicone elastomer material tested in Example XX indicates concerns about problems with cure in a variety of materials. "Cure Inhibition—The cure of SILASTIC MDX4-4210 Medical Grade Elastomer may be inhibited by traces of amines, sulfur, nitrogen oxide, organo-tin compounds and carbon monoxide. Because organic rubbers often contain these substances, they should not come in contact with the uncured elastomer and curing agent. Catalyst residues from silicone elastomers which have been catalyzed by tin salts or peroxides may also inhibit cure." It is therefore a significant and unexpected advantage that the gel molds shown and described herein can be used as molds for silicone elastomers.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A method of forming a flowable composition into a preselected shape comprising the steps of:

a. forming an irreversible polymer gel into a mold which defines a preselected shape, said polymer gel comprising at least one of the group consisting of a gel produced by vinyl polymerization of at least one monomer, a gel produced by condensation polymerization of at least one monomer, a gel produced from a solution of at least one naturally occurring polymer, and a gel produced from a solution of at least one synthetic polymer;

b. contacting a flowable composition with said mold to form said flowable composition into said preselected shape; and, c. solidifying said flowable composition to produce a formed article.

2. A method in accordance with claim 1 wherein said polymer gel produced by vinyl polymerization of monomers comprises at least one of the group consisting of a gel made by polymerizing at least one monofunctional vinyl monomer and at least one multifunctional vinyl monomer, a gel made by polymerizing at least one multifunctional vinyl monomer, a gel made by polymerizing hydroxymethylacrylamide in $H_2O$, and a gel made by polymerizing hydroxymethylacrylamide and a water-soluble comonomer in $H_2O$.

3. A method in accordance with claim 1 wherein said polymer gel produced by condensation polymerization of a monomer comprises at least one polymer system selected from the group consisting of epoxies, urethanes, phenolics, furans, and melamines.

4. A method in accordance with claim 1 wherein said polymer gel produced from a solution of a natural polymer comprises at least one polysaccharide.

5. A method in accordance with claim 1 wherein said polymer gel produced from a solution of a natural polymer comprises at least one protein.

6. A method in accordance with claim 5 said protein comprises albumin.

7. A method in accordance with claim 1 wherein said polymer gel produced from a solution of a synthetic polymer comprises at least one polymer selected from the group consisting of cellulose, a cellulose derivative, poly (vinyl alcohol), poly (acrylic acid), and poly (acrylamide).

8. A method in accordance with claim 1 wherein said polymer gel body further comprises a reinforcement material.

9. A method in accordance with claim 8 wherein said reinforcement material further comprises at least one of the group consisting of particles, plates and fibers.

10. A method in accordance with claim 1 wherein said flowable composition further comprises a particulate phase, a solvent, a monomer system soluble in said solvent, and an initiator system for polymerizing said monomer system, said solvent, said monomer system, and said initiator system comprising a binder phase.

11. The method of claim 10 further comprising the additional steps of:
   d. volatilizing said binder phase; and,
   e. sintering said particulate phase to form a dense sintered article.

12. The method of claim 10, wherein said particulate phase is selected from the group comprising metals, ceramics, carbon, and mixtures thereof.

13. A method in accordance with claim 1 wherein said flowable composition further comprises at least one of the group consisting of a chemically bonded ceramic composition, a silicone rubber based composition, and a fluid polymer based composition.

14. A method in accordance with claim 13, wherein said chemically bonded ceramic composition further comprises at least one of the group consisting of a plaster composition, a cementitious composition, a phosphoric acid bonded alumina composition, and a calcium aluminiate-based composition.

15. A method in accordance with claim 14 wherein said plaster composition further comprises plaster of paris.

16. A method in accordance with claim 14 wherein said cementitious composition further comprises a portland cement-based composition.

17. A method in accordance with claim 13 wherein said a fluid polymer based composition further comprises at least one of the group consisting of a urethane, an epoxy, and an unsaturated polyester.

18. The method of claim 1 wherein at least a portion of said polymer gel forms a core defining an internal surface of said preselected shape.

19. The method of claim 18 wherein said core is removed via volatilization from said solidified article.

20. A method of forming a flowable composition into a preselected shape comprising the steps of:
   a. forming a polymer gel into a mold which defines a preselected shape;
   b. isotropically reducing said gel mold in size by a preselected percentage by at least partially driving said gel mold;
   c. contacting a flowable composition with said mold to form said flowable composition into said preselected shape; and,
   d. solidifying said flowable composition to produce a formed article.

* * * * *